Jan. 28, 1930.  S. J. FOX  1,744,957
OUTSIDE DOOR HANDLE FOR VEHICLES
Filed July 2, 1928
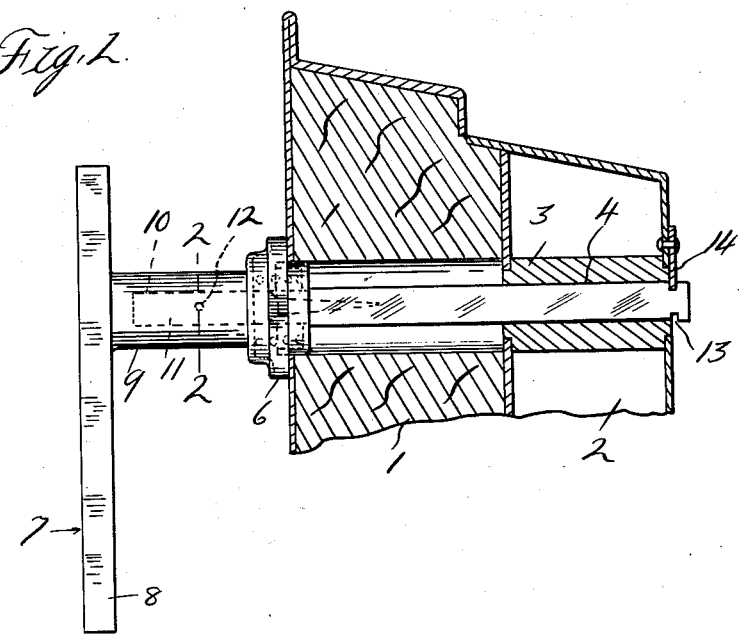
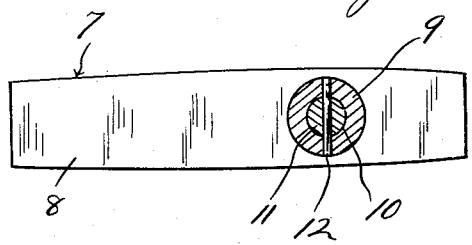
INVENTOR
Simon J. Fox
BY
ATTORNEYS Patented Jan. 28, 1930

1,744,957

UNITED STATES PATENT OFFICE

SIMON J. FOX, OF EAST TAWAS, MICHIGAN

OUTSIDE DOOR HANDLE FOR VEHICLES

Application filed July 2, 1928. Serial No. 289,906.

The invention relates to outside door handles for vehicles and has for its main object to so construct an outside door handle that an unauthorized person cannot break or damage the door latch, when locked, through the door handle to gain access to the vehicle. In the past this has been done by passing a pipe over the grip of the handle or engaging a wrench with the handle to provide sufficient leverage to break or damage the door latch. With my invention the connection between the handle and the latch is designed to withstand all required forces for operating the latch from the handle, when the latch is unlocked, and to give or become inoperative under greater forces, such as required to force the latch when locked.

Another object is to so construct the handle that the connection may be readily replaced. Further objects of the invention reside in the novel features of construction and combinations and arrangements of parts as more fully hereinafter set forth.

In the drawings:—

Figure 1 is a plan view of a handle, embodying my invention and showing a vehicle door and latch to which the handle is attached in horizontal section;

Figure 2 is a cross section on the line 2—2 of Figure 1.

The outside vehicle door handle embodying my invention is designed to prevent an unauthorized person from breaking or damaging the door latch, when locked, by turning the handle. As shown, 1 is the door of a closed motor vehicle and 2 is the door latch secured in the rear side of the door and provided with the oscillating roll-back 3, which constitutes the actuating element of the latch. This roll-back has a polygonal opening for engagement by the corresponding polygonally shaped portion 4 of the latch operating spindle 5 which extends forwardly through the door. 6 is the escutcheon secured to the front side of the door and apertured for the passage of the spindle.

7 is the handle member having the grip 8 and the shank 9. This shank has a cylindrical recess 10 for engaging the cylindrical portion 11 at the outer end of the spindle. 12 is a pin which extends through aligned transverse openings in the shank 9 and cylindrical portion 11 for securing the handle member to the spindle. This pin is designed to have sufficient strength to turn the spindle with the handle member under force required to operate the latch, when unlocked, and to shear and become inoperative as a connection under greater force when the latch is locked. In other words, the pin functions as an operative connection for operating the door latch from the handle when the door latch is unlocked, but constitutes a protective device for the door latch when locked, so that the door latch cannot be damaged or broken to gain access to the motor vehicle. The ends of the pin are flush with the surface of the handle shank and have the same finish so that the pin will not be noticed. However, if this pin is sheared off the location of its end portions may be determined so that they may be removed and the handle member reengaged with the spindle and a new pin of the same kind may be readily inserted.

To prevent withdrawal of the handle and latch operating spindle and subsequent replacement by another handle and latch operating spindle in the event that and after the means for securing the escutcheon to the door has been removed, the inner end of the latch operating spindle 5 is formed with the annular groove 13 into which extends the plate 14, this plate being secured to the door latch casing.

What I claim as my invention is:

An outside door handle for vehicles comprising a handle having a shank member, a latch operating spindle member, one of said members having a portion with a cylindrical recess and the other of said members having a cylindrical portion engaging in the recess, and means extending transversely of the axis of said cylindrical portion and connecting said recessed and cylindrical portions, said means being designed to have sufficient strength to turn said spindle member from said handle member under force required to normally operate the latch when the latch is free for movement and to shear under greater force when the latch is locked from movement to thereby protect the latch at this time.

In testimony whereof I affix my signature.

SIMON J. FOX.